United States Patent
Weel

(10) Patent No.: US 9,992,267 B2
(45) Date of Patent: *Jun. 5, 2018

(54) METHOD AND DEVICE FOR SHARING A PLAYLIST AT A DEDICATED MEDIA PLAYER DEVICE

(71) Applicant: Black Hills Media, LLC, Wilmington, DE (US)

(72) Inventor: Martin Weel, Modjeska, CA (US)

(73) Assignee: BLACK HILLS MEDIA, LLC, Peterborough, NH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/443,926

(22) Filed: Feb. 27, 2017

(65) Prior Publication Data
US 2017/0237802 A1    Aug. 17, 2017

Related U.S. Application Data

(60) Continuation of application No. 14/209,296, filed on Mar. 13, 2014, now Pat. No. 9,584,591, which is a continuation of application No. 13/893,599, filed on May 14, 2013, which is a continuation of application No. 13/555,557, filed on Jul. 23, 2012, now Pat. No. 8,458,356, which is a continuation of application No. 12/114,286, filed on May 2, 2008, now Pat. No. 8,230,099, which is a division of application No. 10/840,110, filed on May 5, 2004, now Pat. No. 8,028,038.

(51) Int. Cl.
*G06F 15/16*    (2006.01)
*H04L 29/08*    (2006.01)
*H04W 76/02*    (2009.01)
*G08C 17/02*    (2006.01)

(52) U.S. Cl.
CPC .............. *H04L 67/06* (2013.01); *G08C 17/02* (2013.01); *H04W 76/02* (2013.01)

(58) Field of Classification Search
CPC ......... G08C 17/02; H04L 67/06; H04W 76/02
See application file for complete search history.

(56) References Cited

U.S. PATENT DOCUMENTS

| 7,325,043 | B1 * | 1/2008 | Rosenberg | G06Q 30/02 |
| | | | | 707/999.104 |
| 8,990,856 | B2 * | 3/2015 | Zott | H04N 7/17318 |
| | | | | 725/39 |
| 9,619,198 | B2 * | 4/2017 | Panguluri | G06F 3/16 |
| 2008/0147711 | A1 * | 6/2008 | Spiegelman | G06F 17/3002 |
| 2009/0228919 | A1 * | 9/2009 | Zott | H04N 7/17318 |
| | | | | 725/34 |

* cited by examiner

*Primary Examiner* — Mohamed A Wasel

(57) ABSTRACT

A playlist is received at a television from a remote playlist source coupled to the television over a network. The playlist includes at least one video item identifier that identifies at least one video item. The playlist is communicated from the television to a cellular phone coupled to the television over the network. The at least one video item identifier is received at the television from the cellular phone. The at least one video item is rendered by the television. The television, the cellular phone, and the remote playlist source are all separate devices. The at least one video item identifier identifies at least one video item having been played during a time duration selected from the group consisting of today, a past week, a past month, and a past year.

20 Claims, 6 Drawing Sheets

METHOD AND DEVICE FOR SHARING A PLAYLIST AT A DEDICATED MEDIA PLAYER DEVICE

RELATED APPLICATIONS

This patent application is a continuation of co-pending U.S. patent application Ser. No. 14/209,296, filed Mar. 13, 2014, entitled, "METHOD AND DEVICE FOR SHARING A PLAYLIST AT A DEDICATED MEDIA PLAYER DEVICE," now U.S. Pat. No. 9,584,591, which is a continuation of co-pending U.S. patent application Ser. No. 13/893,599, filed May 14, 2013, entitled, "SYSTEM AND METHOD FOR SHARING PLAYLISTS," which is a continuation of co-pending U.S. patent application Ser. No. 13/555,557, filed Jul. 23, 2012, entitled, "SYSTEM AND METHOD FOR SHARING PLAYLISTS," now U.S. Pat. No. 8,458,356, which is a continuation of U.S. patent application Ser. No. 12/114,286, filed May 2, 2008, entitled "SYSTEM AND METHOD FOR SHARING PLAYLISTS," now U.S. Pat. No. 8,230,099, which is a divisional of U.S. patent application Ser. No. 10/840,110, filed May 5, 2004, entitled "METHOD AND DEVICE FOR OBTAINING A PLAYLIST BASED ON USER PROFILE MATCHING," now U.S. Pat. No. 8,028,038, each of which is hereby incorporated herein by reference in its entirety. This patent application is also related to U.S. patent application Ser. No. 10/840,104, filed May 5, 2004, entitled "HYBRID SET-TOP BOX FOR DIGITAL ENTERTAINMENT NETWORK," now abandoned; U.S. patent application Ser. No. 10/840,109, filed May 5, 2004, entitled "METHOD AND SYSTEM FOR EMPLOYING A FIRST DEVICE TO DIRECT A NETWORKED AUDIO DEVICE TO OBTAIN A MEDIA ITEM," now U.S. Pat. No. 8,028,323; U.S. patent application Ser. No. 13/207,113, filed Aug. 10, 2011, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST," now U.S. Pat. No. 8,214,873; U.S. patent application Ser. No. 13/539,923, filed Jul. 2, 2012, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST;" U.S. patent application Ser. No. 10/840,108, filed May 5, 2004, entitled "DEVICE DISCOVERY FOR DIGITAL ENTERTAINMENT NETWORK," now U.S. Pat. No. 9,826,046; U.S. patent application Ser. No. 12/114,273, filed May 2, 2008, entitled "SYSTEM AND METHOD FOR SHARING PLAYLISTS," now abandoned, which is a divisional of the above-referenced U.S. patent application Ser. No. 10/840,110, filed May 5, 2004, entitled "METHOD AND DEVICE FOR OBTAINING A PLAYLIST BASED ON USER PROFILE MATCHING," now U.S. Pat. No. 8,028,038; and U.S. patent application Ser. No. 12/019,015, filed Jan. 24, 2008, entitled "DEVICE DISCOVERY FOR DIGITAL ENTERTAINMENT NETWORK," now U.S. Pat. No. 9,178,946, which is a divisional of the above-referenced U.S. patent application Ser. No. 10/840,108, filed May 5, 2004, entitled "DEVICE DISCOVERY FOR DIGITAL ENTERTAINMENT NETWORK," now U.S. Pat. No. 9,826,046; each of which is hereby incorporated by reference in its entirety.

FIELD

The present invention relates generally to the sharing of playlists. The present invention relates more particularly to a system and method for sharing playlists wherein a dedicated media player is configured to receive, store, and display playlists and to play selections from playlists.

BACKGROUND

Playlists for music and movies are well known. A playlist is a list of a user's favorite selections. Popular personal computer (PC) media playing programs, such as Windows Media Player (a trademark of Microsoft Corporation), offer the capability for a user to compile a playlist. The user may subsequently select items to be played from the playlist and the media playing program then plays the selected items. The use of such a playlist simplifies the selection process and thus makes listening to music or viewing movies easier and more enjoyable.

Typically, such selection is accomplished by viewing a playlist within the media playing program and by designating which selection is to be played. The selection to be played may be designated by clicking on it with a mouse, for example.

Playlists also facilitate the playing of a plurality of selections in a particular order. That is, the playlist may be compiled in an order in which the playing of selections therefrom is desired. The selections may then be automatically played sequentially from the playlist. Typically, selections may also be played randomly from a playlist.

Playlists are typically compiled by reviewing a list of selections available for play and then choosing those selections that the user would like to have on the playlist. Thus, a user may review songs that are stored on a personal computer's hard drive and compile a playlist therefrom, for example.

The playlist may subsequently be edited or updated as new selections become available and/or the user's preferences change. Thus, a user's playlist may reflect a group of selections that was compiled over an extended length of time, such as several years.

The sharing of playlists is also known. Popular file sharing programs, such as Kazaa (a trademark of Sharman Networks), facilitate the sharing of playlists. Using such systems, it is possible for a user to download a list of songs or movies that another individual has compiled. This list may then be used to make or modify a playlist for the user.

Although such playlists and playlist sharing systems have proven generally suitable for their intended purposes, they possess inherent deficiencies, which detract from their overall effectiveness and desirability. For example, according to contemporary methodology, playlists are only communicated to and used with general purpose computers, such as IBM compatible personal computers (PCs) and Apple computers.

Further, there is no contemporary system for easily identifying people who have similar interest, such that their playlist can be downloaded. Rather, according to contemporary methodology, playlists are obtained by searching on keywords, such as the titles of selections contained within the playlists. However, the mere fact that the person's playlist has a particular selection in it does not necessarily mean that the playlist contains other selections that a user may enjoy.

As such, although the prior art has recognized, to a limited extent, the problems of finding and using playlists, the proposed solutions have, to date, been ineffective in providing a satisfactory remedy. Therefore, it is desirable to provide a system and method for sharing playlists, wherein the playlists are communicated to, stored in, and displayed upon player devices other than general purpose computers. It is also desirable to provide a method for identifying playlists that are likely to contain selections that will be enjoyed by a user.

SUMMARY

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. More particularly, according to one aspect the present invention comprises a system for sharing playlists, wherein the system comprises a dedicated media player that is configured to receive a playlist and to display the playlist. Selections from the playlist may thus be chosen and played, as desired.

As used herein, a dedicated media player is defined as a media player other than a general purpose computer. Further details on the use of this term and examples of dedicated media players are provided below.

According to another aspect, the present invention comprises a system for sharing playlists, wherein the system comprises a network and a player device. The player device typically comprises either a dedicated media player or a remote control for a dedicated media player.

The player device is in communication with the network and the player device is configured to receive a playlist, store the playlist, display the playlist, and play a selection from the playlist.

The network may comprise any desired type of network. Preferably, the network comprises a wide area network (WAN), such as the Internet. However, the network may alternatively comprise a local area network (LAN).

Player devices include music players, video players, and remote controls for music players and video players. More specific examples of player devices include MP3 players, cellular telephones, set top boxes, a stereos, televisions, car stereos, video monitors, and video storage player devices, as well as remote controls for any of these devices. One example of a video storage player device is TiVo (a trademark of TiVo, Inc.).

The player device may be a portable player device that is configured to receive streaming audio. The player device may also be a non-portable player device that is configured to receive streaming audio and/or a remote control therefor.

The player device may comprise a network adapter, such as an Ethernet card, to facilitate communication with a network. The player device may comprise either a wired or wireless network adapter. Examples of wireless network adapters include those that comply with the Bluetooth (a trademark of Bluetooth SIG, Inc.) standard and those that comply with the WiFi (a trademark of the WiFi Alliance) standard.

The player device preferably comprises an LCD display for displaying the playlist. However, any other suitable type of display may similarly be utilized.

The player device is preferably configured to facilitate searching for playlists. That is, the player device upon which the playlists are stored and displayed is preferably also capable of locating, requesting and retrieving playlists, preferably by merely pushing a button.

Alternatively, playlists may be located and requested via the use of a general purpose computer or the like. Playlists do not have to be requested by the same device that receives the playlist. For example, a general purpose computer may be used to request playlists that are then communicated from other general purpose computers or other dedicated media players to the user's player device.

According to one aspect, the present invention comprises a server upon which a plurality of playlists is stored and the player device is configured to receive playlists from the server. Thus, the player device may participate in the network as a client according to a client/server model of the network.

According to another aspect, the present invention does not include a server. Rather, the present invention comprises a plurality of other player devices and/or general purpose computers upon which a plurality of playlists are stored and the user's player device is configured to receive playlists from the other player devices and/or general purpose computers. Thus, the user's player device may participate in the network as a peer according to a peer-to-peer model of the network.

Preferably, the player device is configured to store a plurality of different playlists. Thus, the user may select a particular playlist according to the user's location, whom the user is with, the type of player device the selection is to be played upon, or the preference of the user based upon any objective or subjective criteria or merely based upon a whim.

According to another aspect, the present invention comprises a player device defined by a dedicated media player and/or a remote control for the media player, wherein the player device comprises a receiving circuit for receiving playlists and a display for displaying the playlists.

According to another aspect, the present invention comprises a server within which is stored a plurality of playlists. The server is configured to communicate the playlist to a player device that is not a general purpose computer.

According to another aspect, the present invention comprises a method for sharing playlists, wherein the method comprises communicating a playlist to a player device comprising a dedicated media player and/or a remote control for the dedicated media player.

According to another aspect, the present invention comprises a method for sharing playlists, wherein the method comprises communicating a playlist to a player device that is not a general purpose computer.

Preferably, the method comprises defining a user profile for a recipient of the playlist and matching that user profile to a user profile of another person, wherein the communicated playlist is the playlist of the other person.

The profile preferably includes the type of music listened to, at least one artist, at least one selection, at least one instrument, at least one record company, a region, a country, a state, a city, a school, and/or an ethnicity. Thus, a user may enhance the likelihood of finding a playlist that contains selections enjoyed by another person living in the same city as the user and having the same ethnicity, for example.

According to another aspect, the present invention comprises a method of defining a playlist, wherein the method comprises defining a user profile and the user profile is used to determine selections that may be enjoyed by a user.

The user profile is preferably compared to user profiles of others to determine a match. Then, a playlist of the other person for which a match was determined is communicated to the user and used to at least partially define a playlist for the user.

Optionally, the user profile is used to define a statistical aggregate of other users and the playlist is determined by the statistical aggregate. Thus, the playlist represent an average of the selections enjoyed by a group of other people.

Optionally, the user profile comprises a list of selections enjoyed by the user and a frequency of which these selections are played. For example, the user profile may comprise a list of selections enjoyed by the user and a rating of the selections by the user.

The method optionally comprises defining a period of time and using the period of time to determine which selections were popular then. The playlist comprises at least some of these selections.

As one example, the method further comprises defining a playlist, which comprises at least some selections that were popular during approximately the last week. As a further example, the method further comprises defining a playlist, which comprises at least some selections that were popular during approximately the last month. As yet a further example, the method further comprises defining a playlist, which comprises at least some selections that were popular during approximately the last year.

Thus, a user may enhance the likelihood of finding a playlist that contains selections enjoyed by another person, wherein the selections were released within the last month, for example.

The playlist may optionally be edited to add or remove selections therefrom.

The user's playlist may optionally be updated by adding selections that have been added to the playlist of another. Similarly, the user's playlist may optionally be updated by removing selections that have been removed from the playlist of another. Such updating may optionally be performed automatically.

Optionally, selections may automatically be added to a playlist when those selections are played in excess of a predetermined rate by the player. Similarly, selections may automatically be deleted from a playlist when those selections are played less than a predetermined rate by the player.

Optionally, one or more selections on a playlist may be designated as private. Any selections on the playlist that are designated as private are not shared with others.

Optionally, any selections on the playlist that are not compatible with the player with which the playlist is associated are removed therefrom. Compatibility may be due to hardware limitations of the player. For example, an MP3 player may not be able to play other formats of audio and may not be able to play the audio tracks of a video selection (such as a movie). Therefore, if such material is included in a playlist, it may automatically be deleted therefrom. Optionally, such deletion may require user approval.

Further, a music player may have limitations that the user desires to be taken into account when a playlist is made or updated. For example, a portable audio player may not be able to adequately reproduce bass sounds. Thus, a user may prefer that a playlist for that device not contain selections for which good base reproduction is considered to be desirable. Therefore, if such material is initially included in a playlist, it may automatically be deleted therefrom. Optionally, such deletion may require user approval.

Further, the present invention may be configured so as to remove selections from a playlist that are not considered by the user to be compatible with the location. That is, some selections may not play well do to ambient acoustics. Further, some selections may not be appropriate for a given location. For example, selections that contain material that is not considered by the user to be suitable for minors may be omitted from a player that is located in a family area.

Either individual selections or categories of selections may be removed from a playlist in the above described manner. Thus, an entire genre may be removed from a playlist, if desired.

Optionally, one or more selections on a playlist may be designated as preferred, so as to indicate that the selections are particularly enjoyable for the user. Indeed, a user's playlist may contain only those selections that have been designated as preferred on the playlists of others.

According to the present invention, playlists may be made and used with a variety of different types of media players. For example, playlists comprising audio selections such as music, speeches, comedy routines, and the like may be made and used with audio players. Similarly, playlists comprising movies, filmstrips, videos, and the like may be made and used with video players.

Indeed, audio playlist may contain video selections and vice-versa. As those skilled in the art will appreciate, in some instances it may be desirable to the play the audio tracks of a movie on an audio player and it may similarly be desirable to play songs (without any accompanying video) on a video player. For example, it may be desirable to play the soundtrack from a movie on an audio player.

The present invention is not limited to audio and video selection. According to the present invention, playlists of games, software applications, or any other desired items or information might similarly be made and used. For example, lists of nightclubs or restaurants that have been enjoyed by others may be obtained by using profiles according to the present invention.

According to another aspect, the present invention comprises a method for managing media content on a network, wherein the method comprises using information about a user's previous playing to define a playlist and communicating the playlist to a player device other than a general purpose computer with which the playlist can be stored, displayed, and selections made for playing therefrom.

According to another aspect, the present invention comprises a method for defining a playlist, wherein the method comprises finding at least one other person with similar tastes and communicating a list of selections played by the other user to a player device other than a general purpose computer. The playlist may be updated by communicating an updated list of selections played by the other person to the player device.

According to another aspect, the present invention comprises a method for defining a playlist for a user, wherein the method comprises finding at least one other person with similar tastes by matching a profile of the user to a profile of the other person.

According to another aspect, the present invention comprises a data structure comprising a playlist defined by a method comprising communicating the playlist to a player device that is not a general purpose computer.

According to another aspect, the present invention comprises a data structure comprising a playlist defined by a method comprising defining a user profile and using the user profile to determine selections that may be enjoyed by a user.

According to another aspect, the present invention comprises a computer readable media having stored thereon a data structure comprising a playlist defined by a method comprising communicating the playlist to a player device that is not a general purpose computer.

According to another aspect, the present invention comprises a computer readable media having stored thereon a data structure comprising a playlist defined by a method comprising defining a user profile and using the user profile to determine selections that may be enjoyed by a user.

According to another aspect, the present invention comprises a computer readable media having stored thereon a method for defining a playlist, wherein the method comprises communicating the playlist to a player device that is not a general purpose computer.

According to another aspect, the present invention comprises a computer readable media having stored thereon a method for defining a playlist, wherein the method comprises defining a user profile and using the user profile to determine selections that may be enjoyed by a user.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
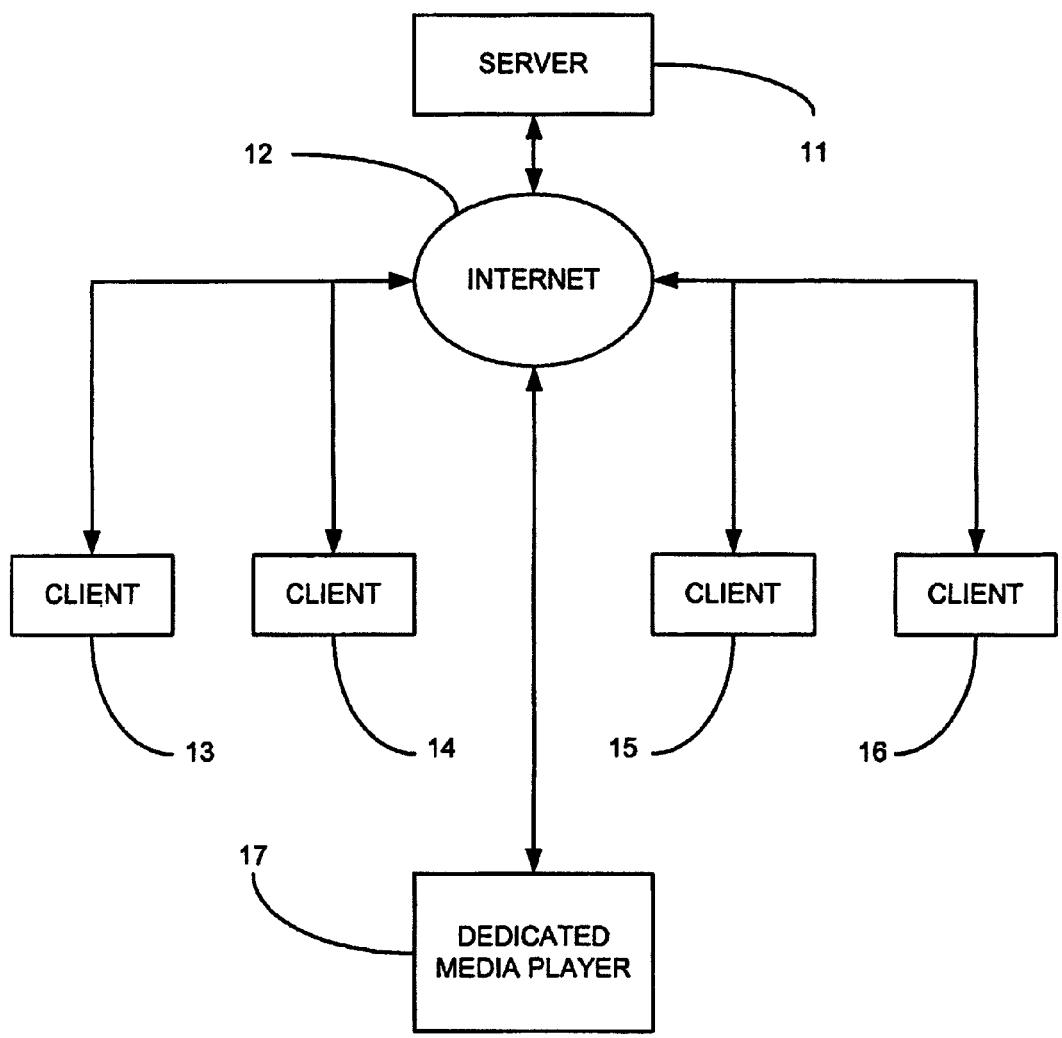
FIG. 1 is a block diagram of an exemplary system for sharing playlists according to the present invention, wherein a server provides playlist to a dedicated media player and wherein the playlists have been obtained from client computers or other devices.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

Although generally discussed herein as being applicable to music and music players, those skilled in the art will appreciate that the system and method for sharing playlists of present invention is likewise applicable to video and video players, as well as games and game players. Indeed, the system and method for sharing playlists of the present invention may find application in a wide variety of information, data, and software arenas. Thus, discussion herein as being applicable to music and music players is by way of example only, and not by way of limitation.

The present invention is illustrated in FIGS. 1-6, which depict presently preferred embodiments thereof. Referring now to FIG. 1, according to one aspect the present invention comprises a server 11 upon which a plurality of playlists from a plurality of different users is stored.

Each client 13-16 may communicate a playlist to the server via a network, such as the Internet 12. The clients 13-16 may be general purpose computers or may be devices other than general purpose computers. The clients 13-16 may be any combination of general purpose computers and devices other than general purpose computers. Thus, the clients 13-16 may be dedicated media players that are network compatible.

For example, the clients 13-16 may be dedicated music players that are configured according to the present invention so as to communicate with the Internet. In this instance, the clients are not general purpose computers. That is, their primary purpose is that of playing music and not of running a wide variety of different types of applications programs, such as is the case with general purpose computers.

As used herein, the term "dedicated" indicates the primary function of a device and the device typically does not perform any other of the functions that a general purpose computer may perform, such as word processing, general data base management and general Internet browsing. However, it is contemplated the a dedicated device may perform some such functions and still remain a dedicated device in the same sense that some cellular telephones facilitate some degree of general purpose computer functionality, such as limited Internet browsing and email, yet they remain primarily telephones and not general purpose computers.

Thus, examples of dedicated media players include music players such as MP3 players, video players such as set top boxes, video recording devices such as TiVo and game players such as X-Box (a trademark of Microsoft Corporation) and PlayStation (a trademark of Sony Computer Equipment, Inc.).

According to one aspect of the present invention, playlists are communicated via the network to a dedicated media player 17 and the dedicated media player 17 is not a general purpose computer. According to another aspect of the present invention, the media player 17 may be a general purpose computer and playlist are obtained by matching user profiles, as discussed in detail below.

After the playlist has been communicated to the dedicated media player 17, the playlist may be displayed thereon and thus used to choose which selection therefrom is to be played.

Figure 2:
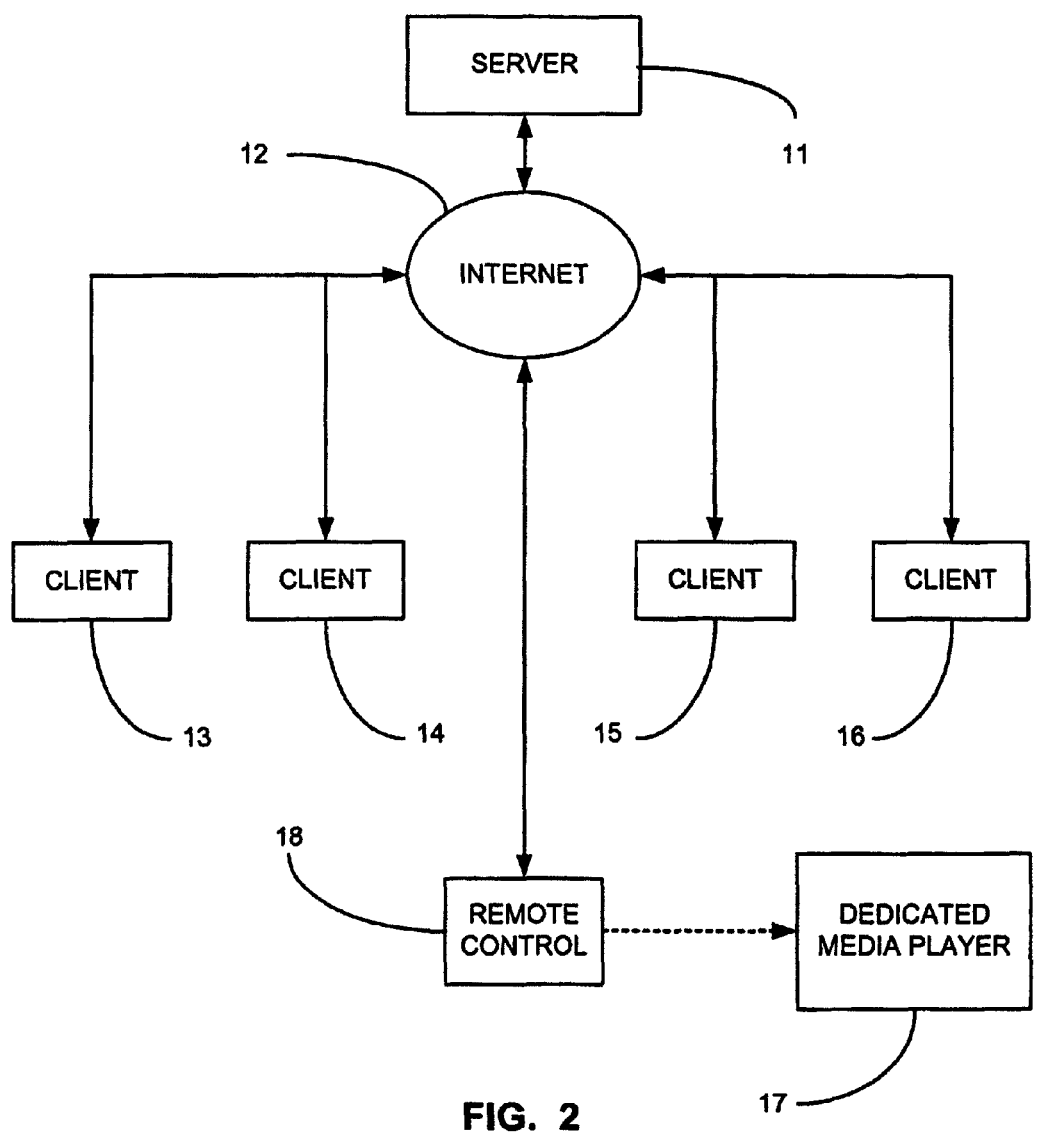
FIG. 2 is a block diagram of another exemplary system for sharing playlists according to the present invention, wherein a server provides playlist to a remote control of a dedicated media player and wherein the playlists have been obtained from client computers or other devices.

Referring now to FIG. 2, rather than communicating a playlist to the dedicated media player 17, the playlist may alternatively be communicated to a remote control 18 for the dedicated media player.

After the playlist has been communicated to the remote control 18, the playlist may be displayed thereon and thus used to choose which selection therefrom is to be played by the dedicated media player 17.

Optionally, playlists that were communicated to the dedicated media player 17 (as shown in FIG. 1) may be further communicated to a remote control therefore. This communication may be from the dedicated media player 17 or from any other source (such as from the server 11 via the Internet 12).

Similarly, playlists that were communicated to the remote control 18 (as shown in FIG. 2) may be further communicated to the dedicated media player 17 associated therewith. This communication may be from the remote control 18 or from any other source (such as from the server 11 via the Internet 12).

Thus, playlists may be stored in, displayed upon, and used to make selections from either the dedicated media player 17, the remote control 18, or both.

Of course, in some instances the dedicated media player 17 will not have a remote control. For example, portable media players, such as MP3 players, will not typically have a remote control. In such instances, the playlist is generally communicated only to the dedicated media player 17 itself. In any instance, other devices, including both dedicated devices and general purpose computers, may receive additional copies of the playlists.

Figure 3:
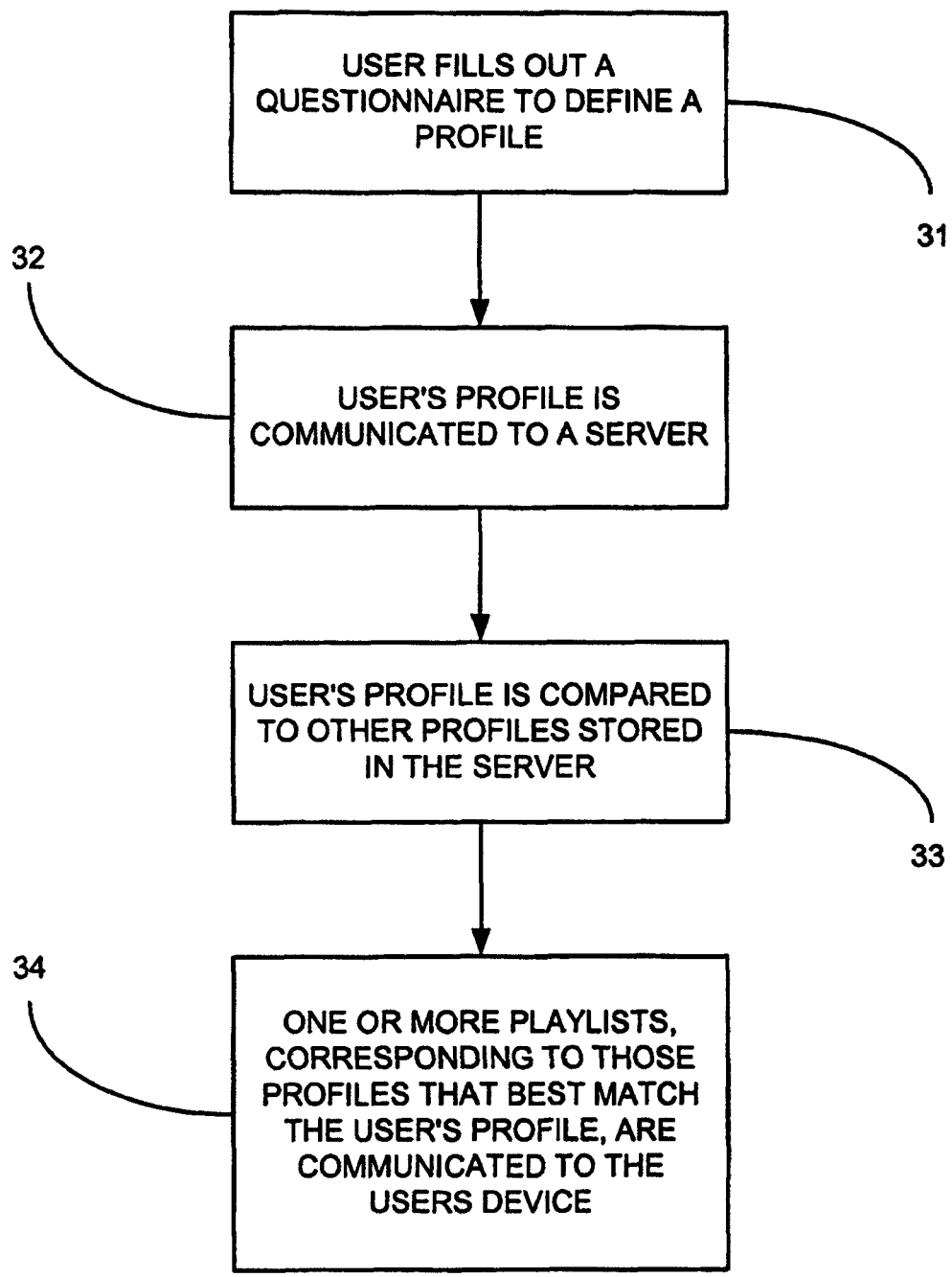
FIG. 3 is a flowchart showing an exemplary method for obtaining playlists, such as a method that may be practiced when using the systems of FIG. 1 or FIG. 2.

Referring now to FIG. 3, a user preferably fills out a questionnaire so as to define a user profile as shown in block 31. The user profile contains information that will facilitate matching of the user to another user having similar tastes and interests, as discussed above.

The user's profile is communicated to a server (such as server 11 of FIGS. 1 and 2), as shown in block 32. At the server, the user's profile is compared to the profiles of other users as shown in block 33. An attempt is made to match the user's profile to the profile of one or more other users, so as to identify other users having similar tastes and interests.

The playlists of one or more other users, whose profiles best match the user's profile, are communicated to the user's device as shown in block 34. Any desired method or algorithm for such matching may be used. For example, each time the responses to two questionnaires match, a number could be added to a score for that particular matching process. The matching processes that result in the highest scores could be considered close enough matches to cause a playlist to be sent. Alternatively, any matching process that result in a score that exceeds a predetermined threshold value may be considered a match.

Optionally, the responses could be weighted such that some responses contribute more to the matching score than other responses. For example, it may be desirable to have matches for selections, artists, or style count more than matches for location or time.

The user's device may be, for example, the dedicated media player 17 of FIGS. 1 and 2 or may alternatively be the remote control 18 for FIG. 2. The playlist may be communicated to both the dedicated media player 17 and the remote control 18, as discussed above.

Both FIGS. 1 and 2 show an exemplary use of the present invention in a client/server network. However, the present invention may also be used in a peer-to-peer network, as discussed below.

Figure 4:
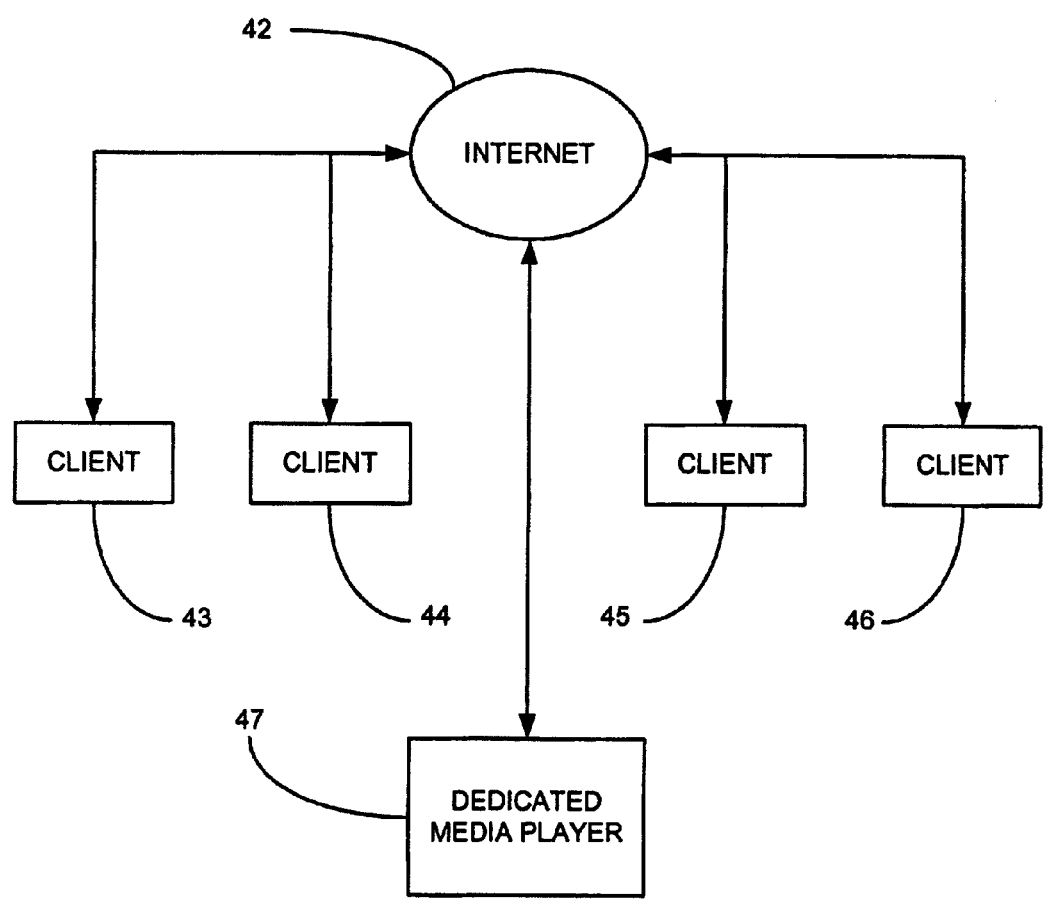
FIG. 4 is a block diagram of another exemplary system for sharing playlists according to the present invention, wherein a peer provides a playlist to a dedicated media player without the use of a server.

Referring now to FIG. 4, a plurality of clients 43-46 communicates via a network, such as the Internet 42, with a dedicated media player 47. As before, the clients 43-46 may be either general purpose computers or devices other than general purpose computers.

Since there is no server in this instance, the dedicated player 47 must communicate with the clients 43-46 on a peer-to-peer basis. For example, the user's profile may be communicated to each of the clients 43-46 and when a match is found, the playlist of the client is communicated back to the user's dedicated media player 47, as shown in FIG. 4.

Alternatively, the dedicated media player 47 may poll each of a plurality of different clients to request their user profiles. The dedicated media player 47 may perform a comparison of the user profiles. Then, the playlists associated with the best matches of the user's profile to the profile of the clients 43-46 are requested and communicated to the dedicated media player.

Figure 5:
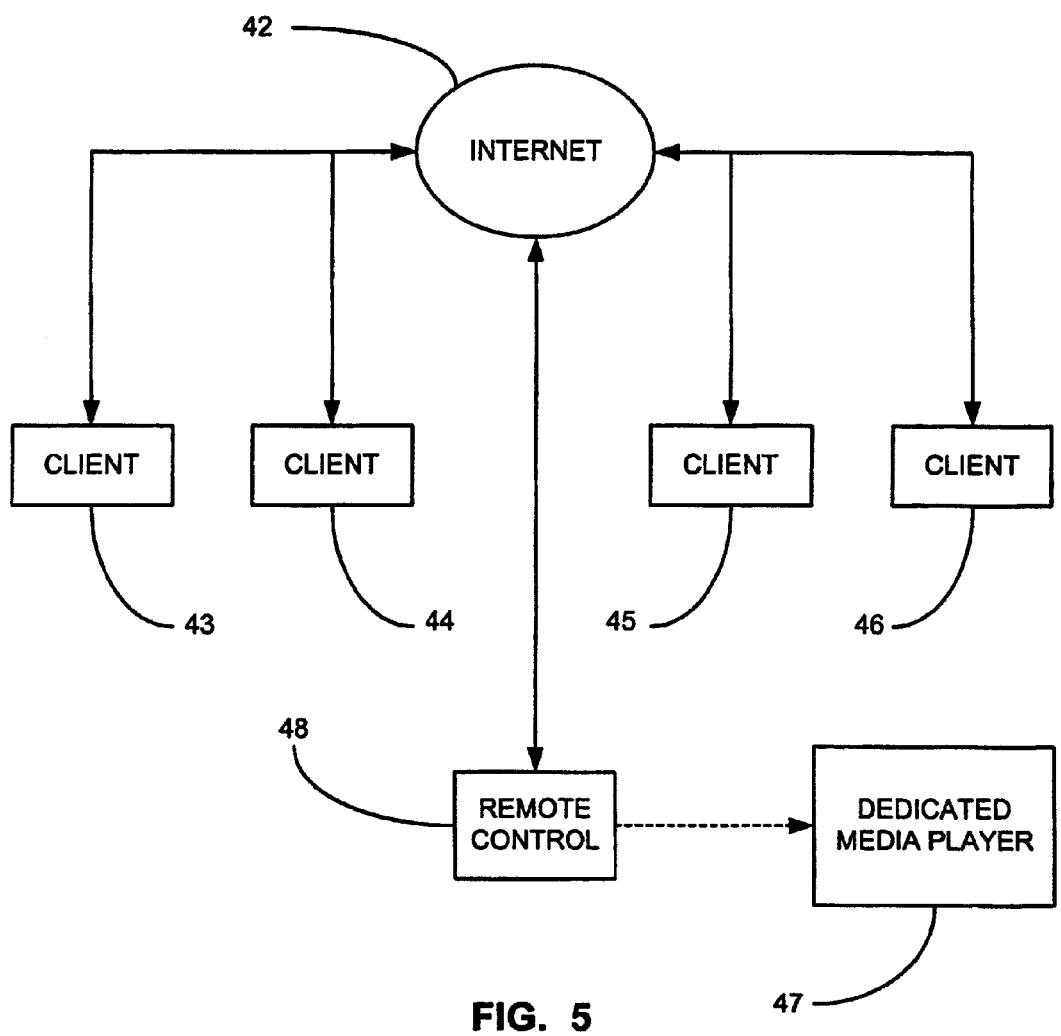
FIG. 5 is a block diagram of another exemplary system for sharing playlists according to the present invention, wherein a peer provides a playlist to a remote control of a dedicated media player without the use of a server.

Referring now to FIG. 5, rather than communicating a playlist to the dedicated media player 47, the playlist may alternatively be communicated to a remote control 48 for the dedicated media player. Thus, the clients 43-46 may communicate their user profiles to the remove control 48, where the comparison is performed and where playlists may be stored and used. As before, playlists may subsequently be forwarded to another device, such as the dedicated media player 47.

After the playlist has been communicated to the remote control 48, the playlist may be displayed thereon and thus used to choose which selection therefrom is to be played.

As before, playlists that were communicated to the dedicated media player 47 (as shown in FIG. 4) may optionally be further communicated to a remote control therefore. This communication may be from the dedicated media player 47 or from any other source (such as from one of the clients 43-46 via the Internet 42).

Similarly, playlists that were communicated to the remote control 48 (as shown in FIG. 5) may be further communicated to the dedicated media player 47 associated therewith. This communication may be from the remote control 48 or from any other source (such as from one of the clients 43-46 via the Internet 12).

Figure 6:
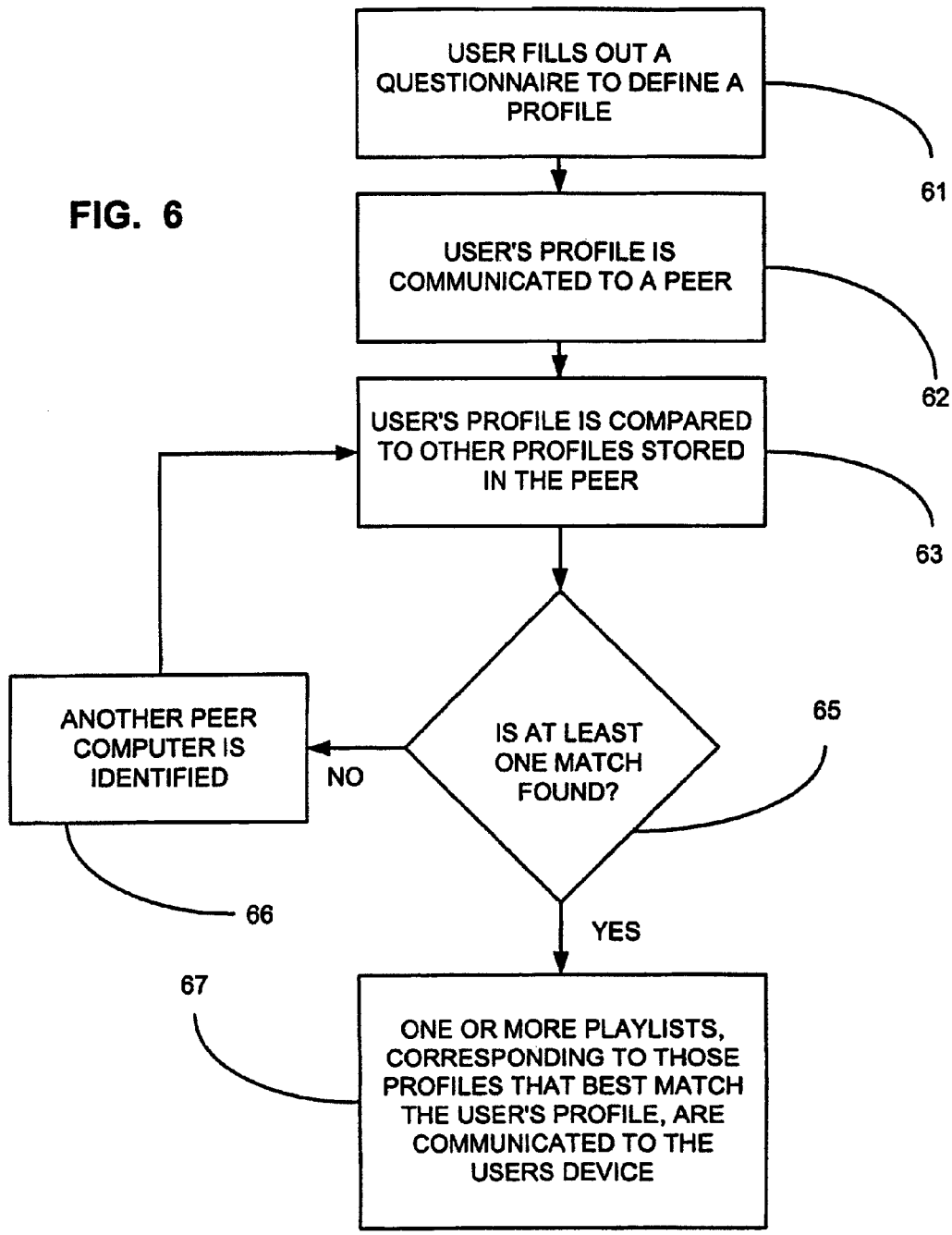
FIG. 6 is a flowchart showing another exemplary method for obtaining playlists, such as a method that may be practiced when using the systems of FIG. 4 or FIG. 5.

Referring now to FIG. 6, one example of how a user's profile may be used to obtain playlists is shown. In a peer-to-peer network, such as those shown in FIGS. 4 and 5, a user again fills out a questionnaire as shown in block 61. However, this time the questionnaire is communicated to a peer as shown in block 62. The user's profile is compared to other profiles stored in the peer, as shown in block 63.

The process is continued until at least one match is found, as shown in block 65. The process may be continued until any desired number of matches are found or until it is determined that further searching is not likely to result in matches.

When it is desirable to continue the searching process, another peer is identified as shown in block 66 and the user's profile is compared to the other profiles as shown in block 63.

Thus, one or more playlists, corresponding to those profiles that best match the user's profile, are communicated to the user's device as shown in block 67.

The present invention provides the ability for non-computer devices to display and play playlists from a central computer running on the Internet. These playlists can be created on one device and shared or sent to another device immediately for playing.

People in the community can be found by comparing listing habits of the community. Once people are found in the community to have similar tastes, playlist can then be shared between the users and then played on their own personal playing devices in real time.

Thus, the present invention provides a system and method for sharing playlists, wherein the playlists are communicated to, stored in, and displayed upon player devices other than general purpose computers. The present invention also provides a method for identifying playlists that are likely to contain selections that will be enjoyed by a user.

It is understood that the exemplary system and method for sharing playlists described herein and shown in the drawings represents only presently preferred embodiments of the invention. Indeed, various modifications and additions may be made to such embodiments Thus, various modifications and additions may be obvious to those skilled in the art and may be implemented to adapt the present invention for use in a variety of different applications.

What is claimed is:

1. A method comprising:
receiving, at a television from a remote playlist source coupled to the television over a network, a playlist, the playlist comprising at least one video item identifier that identifies at least one video item;
communicating the playlist from the television to a cellular phone, the cellular phone coupled to the television over the network;
receiving, at the television from the cellular phone, the at least one video item identifier; and
rendering, by the television, the at least one video item;
wherein the television, the cellular phone, and the remote playlist source are all separate devices and the at least one video item identifier identifies at least one video item having been played during a time duration selected from the group consisting of today, a past week, a past month, and a past year.

2. The method of claim 1, further comprising:
receiving, at the television, information representing a user of the television; and
storing, at the television, the information representing the user.

3. The method of claim 2, further comprising:
selecting, by the television, the playlist based on the information representing the user.

4. The method of claim 1, wherein receiving the playlist from the remote playlist source includes providing with a request at least one of information identifying a user of the television and information identifying a user-association to the playlist at the remote playlist source.

5. The method of claim 1, wherein receiving the playlist from the remote playlist source includes requesting a computer-generated playlist to be generated based on a profile of a user of the television.

6. The method of claim 1, wherein receiving the playlist from the remote playlist source includes requesting a computer-generated playlist to be generated based on a profile of a user of the television, the profile of the user comprising of a play history list of items previously experienced by the user.

7. The method of claim 1, wherein the playlist is computer-modified based on a geographic location of the television.

8. The method of claim 1, wherein the playlist is a list of television user favorites.

9. The method of claim 1, wherein the playlist is a list of items compiled by a person other than a user of the television.

10. The method of claim 1, wherein content identified by the playlist is received from a content server, the content server being separate from the remote playlist source, the television, and the cellular phone.

11. A television comprising:
a communication interface adapted to communicatively couple the television to a remote playlist source and a cellular phone via a network; and
a control system associated with the communication interface and adapted to:
receive, at the television from the remote playlist source, a playlist, the playlist comprising at least one video item identifier that identifies at least one video item;

communicate the playlist from the television to the cellular phone;

receive, by the television from the cellular phone, the at least one video item identifier; and render, by the television, the at least one video item;

wherein the television, the cellular phone, and the remote playlist source are all separate devices and the at least one video item identifier identifies at least one video item having been played during a time duration selected from the group consisting of today, a past week, a past month, and a past year.

12. The television of claim 11, wherein the control system and the communication interface are further adapted to:

receive, at the television, information representing a user of the television; and store, at the television, the information representing the user.

13. The television of claim 12, wherein the control system is further adapted to:

select, by the television, the playlist based on the information representing the user.

14. The television of claim 11, wherein the control system and the communication interface are further adapted to:

provide with a request at least one of information identifying a user of the television and information identifying a user-association to the playlist at the remote playlist source.

15. The television of claim 11, wherein the control system and the communication interface are further adapted to:

request a computer-generated playlist to be generated based on a profile of a user of the television.

16. The television of claim 11, wherein the control system and the communication interface are further adapted to:

request a computer-generated playlist to be generated based on a profile of a user of the television, the profile of the user comprising of a play history list of items previously experienced by the user.

17. The television of claim 11, wherein the playlist is computer-modified based on a geographic location of the television.

18. The television of claim 11, wherein the playlist is a list of television user favorites.

19. The television of claim 11, wherein the playlist is a list of items compiled by a person other than a user of the television.

20. The television of claim 11, wherein content identified by the playlist is received from a content server, the content server being separate from the remote playlist source, the television, and the cellular phone.

* * * * *